Patented Aug. 24, 1954

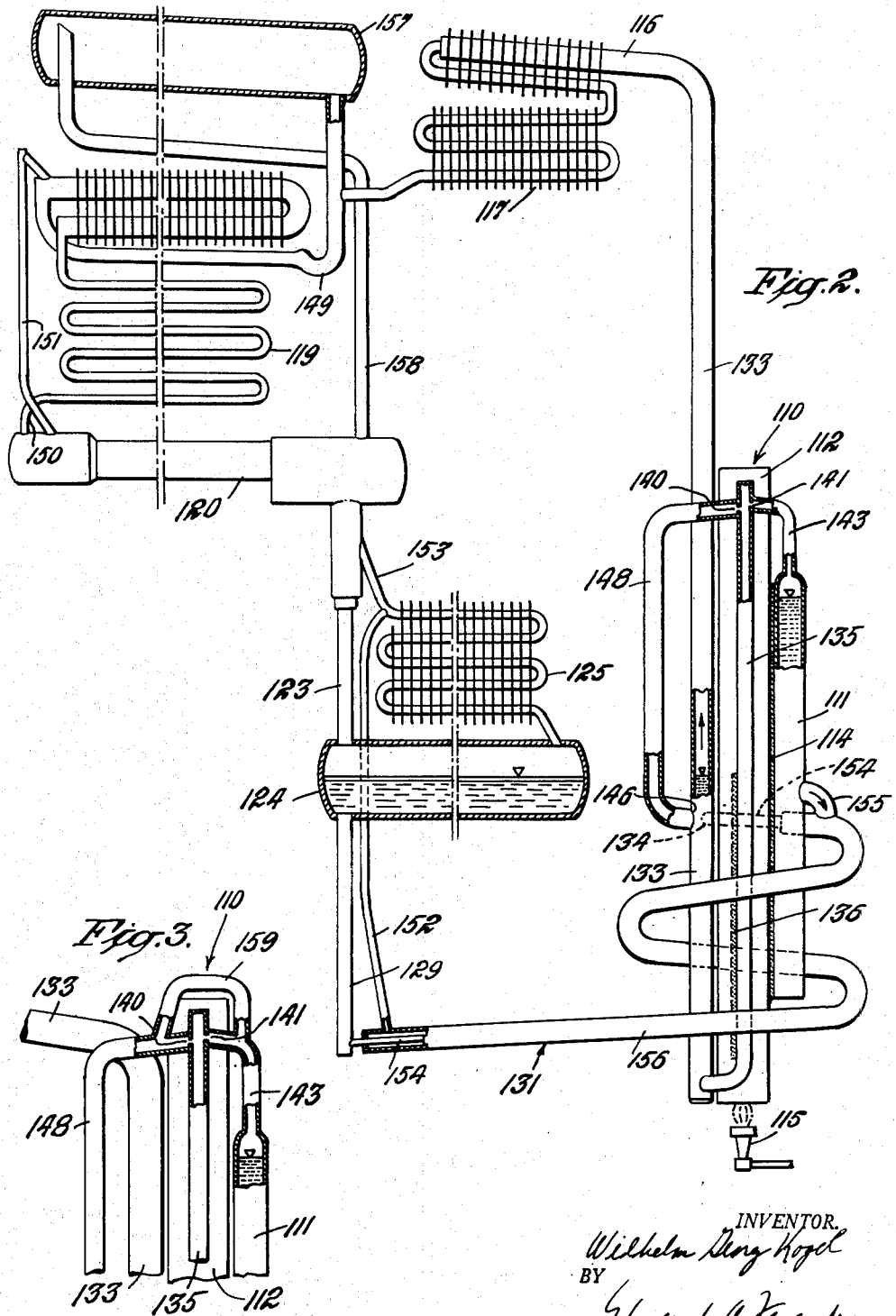

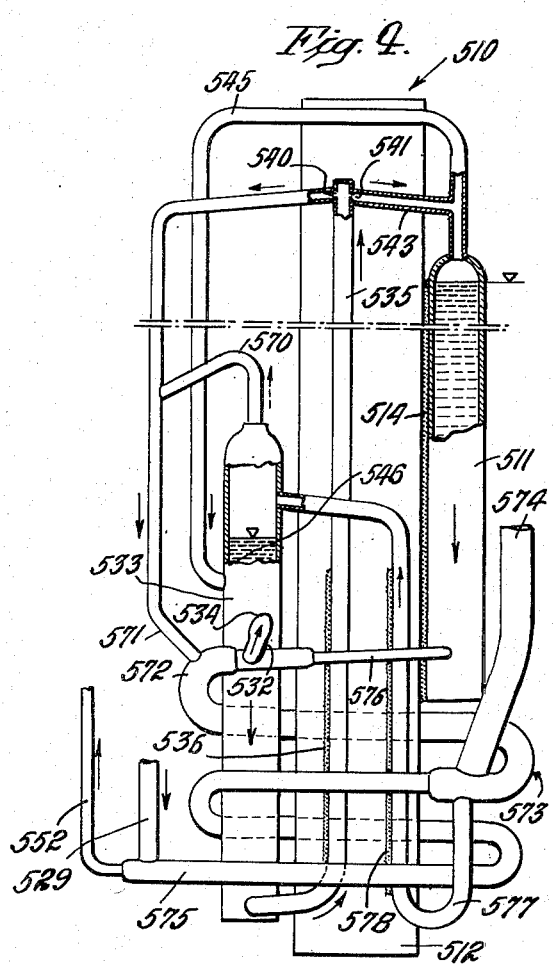

2,687,022

UNITED STATES PATENT OFFICE 2,687,022

REFRIGERATION SYSTEM EMBODYING PROVISIONS FOR DISTRIBUTING LIQUID

Wilhelm Georg Kogel, Stockholm, Sweden, assignor to Aktiebolaget Elektrolux, Stockholm, Sweden, a corporation of Sweden Application April 26, 1950, Serial No. 158,126

Claims priority, application Sweden June 28, 1949

20 Claims. (Cl. 62—119.5)

My invention relates to refrigeration, and is especially concerned with distribution of liquid circulating in refrigeration systems of the absorption type.

It is an object of the invention to provide an improvement in systems of this type for splitting and dividing absorption liquid into a plurality of paths of flow.

Another object is to provide such an improvement for dividing absorption liquid into several paths of flow for controlling the manner in which weak absorption liquid flows through an absorber.

A further object is to provide such an improvement for recirculating a part of the raised absorption solution through a vapor lift tube or pump and only circulating a part of the raised liquid through the absorber of the refrigeration system.

A still further object is to provide an improvement in a vapor-liquid lift pump in which the pumping ratio is sufficiently high to insure reliable pumping and at the same time provision is made for circulating absorption liquid through the absorber at an effective pumping ratio which is relatively low to insure satisfactory performance and efficient operation of the absorber.

A still further object is to provide such an improvement for dividing absorption liquid to divert a part of the liquid, which contains a protective corrosion inhibiting substance, into places not ordinarily washed by absorption liquid.

The invention, together with the above and further objects and advantages thereof, will be more fully understood upon reference to the following description and accompanying drawings forming a part of this specification, and of which:

Fig. 2 is a view like that of Fig. 1 illustrating another embodiment of the invention;

Fig. 3 is a fragmentary view of a part of the system like that shown in Fig. 2 illustrating a modification of the invention; and Fig. 4 is a fragmentary view of a system similar to that shown in Figs. 1 and 2 illustrating a further embodiment of the invention.

Figure 1:
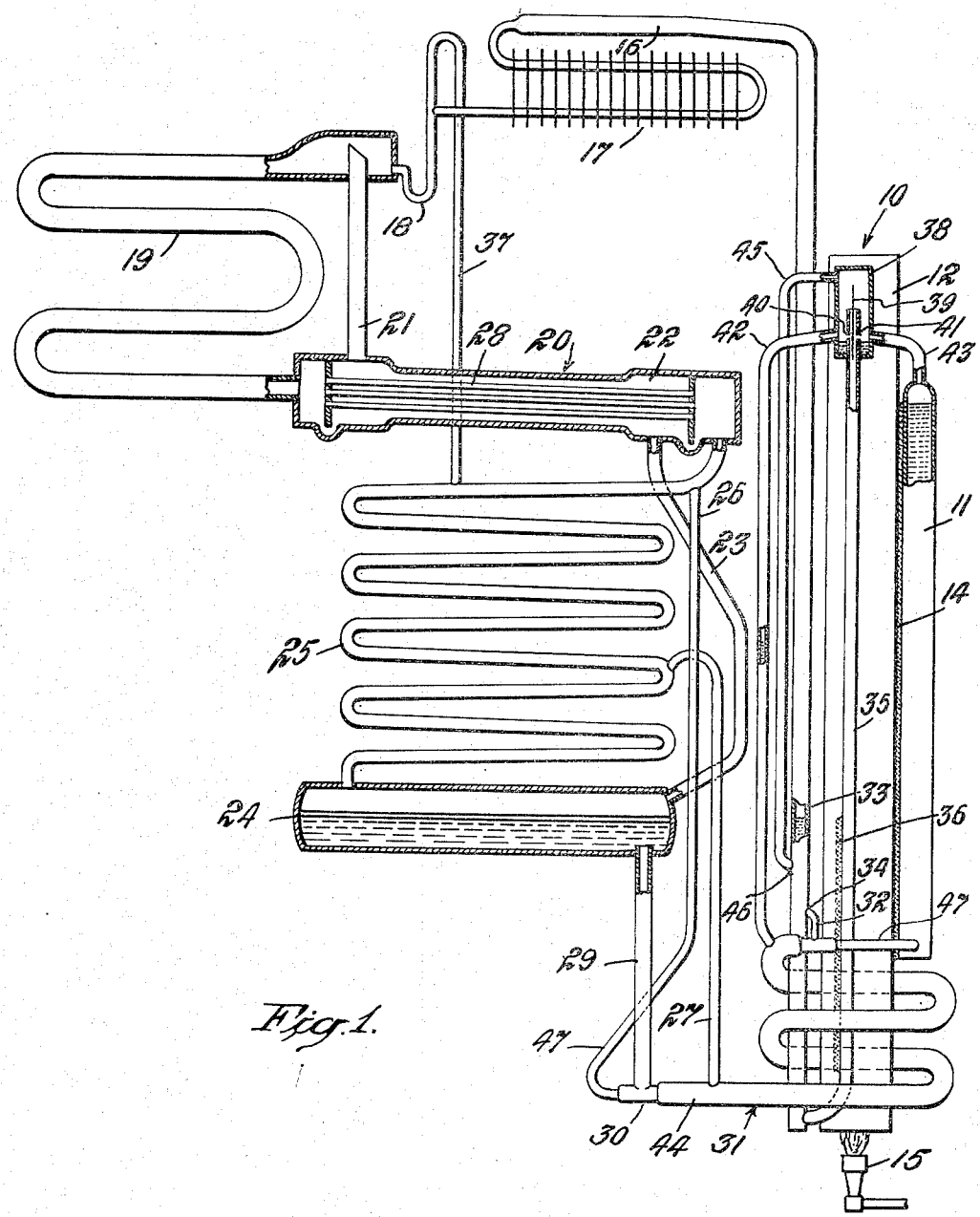
Fig. 1 illustrates more or less diagrammatically a refrigeration system embodying the invention.

Referring to Fig. 1, I have shown my invention in connection with an absorption refrigeration system of a uniform pressure type which is well known in the art and in which a pressure equalizing gas is employed. Such a refrigeration system comprises a vapor expulsion unit 10 including a generator or boiler 11 containing a refrigerant, such as ammonia, in solution in a body of absorption liquid, such as water. Heat is supplied to the boiler 11 from a heating tube or flue 12 thermally connected therewith at 14, as by welding, for example. The heating tube 12 may be heated in any suitable manner, as by an electrical heating element disposed within the lower part of the tube or by a liquid or gaseous fuel burner 15 which is adapted to project its flame into the lower end of the tube.

The heat supplied to the boiler 11 and its contents expels refrigerant vapor out of solution, and, as will be described more fully hereinafter, the vapor passes upwardly from the vapor expulsion unit 10 through an air cooled rectifier 16 into an air cooled condenser 17 in which it is condensed and liquefied. Liquid refrigerant flows from condenser 17 through a U-shaped conduit 18 into a cooling element or evaporator 19 in which it evaporates and diffuses into an inert pressure equalizing gas, such as hydrogen, which enters the lower end thereof from a gas heat exchanger 20. Due to evaporation of refrigerant fluid into inert gas, a refrigerating effect is produced with consequent absorption of heat from the surroundings.

The rich gas mixture of refrigerant vapor and inert gas formed in cooling element 19 flows from the upper part thereof through a conduit 21, one passage 22 of gas heat exchanger 20, conduit 23 and absorber vessel 24 into the lower end of an absorber coil 25. In absorber coil 25 the rich gas mixture flows countercurrent to downwardly flowing absorption liquid which is introduced into the absorber through conduits 26 and 27 in a manner to be described presently. The absorption liquid absorbs refrigerant vapor from inert gas, and inert gas weak in refrigerant flows from absorber coil 25 through another passage 28 of the gas heat exchanger 20 into the lower part of cooling element 19.

The circulation of gas in the inert gas circuit just described is due to the difference in specific weight of the columns of gas rich and weak, respectively, in refrigerant vapor. Since the column of gas rich in refrigerant vapor and flowing from cooling element 19 to the absorber coil 25 is heavier than the gas weak in refrigerant and flowing from the absorber coil 25 to cooling element 19, a force is produced or developed within the system for causing circulation of inert gas in the manner described.

Absorption solution enriched in refrigerant flows from the absorber vessel 24 through a conduit 29 and a passage or pipe 30 of liquid heat exchanger 31 disposed about the lower part of the vapor expulsion unit. Such enriched absorption solution is conducted from the passage or pipe 30 through a connection 32 into a vertically extending pipe 33 at a point 34 which is at a level below the liquid surface level in the absorber vessel 24 and also below the surface level of the column of liquid contained in the pipe 33. The extreme lower end of pipe 33 is closed and in communication with the lower end of a vapor lift pipe 35 in thermal exchange relation with the heating tube 12 at 36, as by welding, for example. Liquid is raised by vapor-liquid lift action through pipe 35 into the upper part of boiler 11. Refrigerant vapor expelled out of solution in boiler 11, together with refrigerant vapor discharged from the upper end of pipe 35, flows upwardly from the vapor expulsion unit 10 to the condenser 17 in a manner to be described presently. The outlet end of condenser 17 is connected by a conduit 37 to a part of the gas circuit, as to the upper part of absorber coil 25, for example, so that any inert gas which may pass through the condenser 17 can flow to the gas circuit.

In refrigeration systems of the kind being described it is often desirable to split up and divide liquid circulating in the system into a number of separate streams. In many instances there is a requirement of taking liquid in its path of flow and accurately dividing such flowing liquid into several streams whereby a definite part or percentage of the liquid will flow in each stream. In accord with my invention I provide an improvement for reliably dividing absorption liquid circulating in the system which in Fig. 1 is advantageously embodied in the vapor expulsion unit 10. The liquid divider of Fig. 1 is associated with the vapor lift pipe 35 whose upper end extends into a vessel 38. The upper part of pipe 35 in its lengthwise direction is provided with a separating or dividing wall 39, such wall 39 not only serving as a separating or dividing member for the pipe 35 but also for the vessel 38.

The upper end of pipe 35 at opposite sides of the separating wall 39 is formed with openings 40 and 41 through which absorption liquid passes while being raised through the pipe 35 by vapor-liquid lift action. The upper ends of conduits 42 and 43 are connected to the vessel 38 at approximately the same level which is slightly below the openings 40 and 41 in vapor lift pipe 35. Raised liquid passing through opening 41 flows from the right-hand side of vessel 38 through conduit 43 into the upper part of boiler 11. Raised liquid passing through opening 40 flows from the left-hand side of vessel 38 through conduit 42 whose lower end is connected to the outer passage or pipe 44 of the liquid heat exchanger 31.

The vessel 38 serves not only as the place where division of liquid occurs but also as a vapor separator in which lifting vapor is separated from raised liquid. Vapor expelled out of solution in boiler 11 passes through conduit 43 into vessel 38 and mixes with such separated vapor which can pass from the upper open end of pipe 35. All of the vapor generated in the vapor expulsion unit flows from the upper part of vessel 38 through a conduit 45 to a region 46 in pipe 33 which is below the surface level of the liquid column contained therein. The region 46 may be referred to as an analyzer in which entering vapor bubbles through enriched absorption solution and is analyzed, whereby absorption liquid vapor will be removed from refrigerant vapor. After being analyzed the vapor flows upwardly through the upper part of pipe 33 which constitues a vapor supply line leading to the air-cooled rectifier 16 and air-cooled condenser 17.

The principal part of generated vapor produced in the vapor expulsion unit 10 is expelled from solution in boiler 11 due to heating by the heating tube 12, and liquid of decreasing concentration flows downwardly in boiler 11 and passes therefrom through an inner passage 47 of liquid heat exchanger 31 and conduit 27 into the extreme upper end of absorber coil 25. As previously explained, liquid passing downwardly in conduit 42 flows into the outer passage 44 of the liquid heat exchanger from which the liquid flows through conduit 27 into an intermediate part of absorber coil 25.

Since solution that is raised by vapor lift pipe 35 and passes into boiler 11 is subjected to further heating in the boiler while raised solution passing into conduit 42 is not subjected to such additional heating, the absorption solution supplied to the upper part of absorber 25 through conduit 26 will be substantially weaker in refrigerant than the solution supplied only to the lower part of the absorber 25 through conduit 27. The evaporating temperature of refrigerant fluid in evaporator 19 is a function of the partial pressure of refrigerant vapor. The more effectively refrigerant vapor is absorbed from inert gas in absorber 25, the less refrigerant vapor will be contained in the inert gas entering evaporator 19.

When inert gas enriched in refrigerant enters the lower end of absorber coil 25, it first comes in contact with absorption solution which is a mixture of solution introduced into the absorber through both conduits 26 and 27 and has the highest concentration of refrigerant. Thereafter, the inert gas comes in contact with absorption solution in the upper part of absorber 25 which has a weaker concentration of refrigerant. Thus, by subdividing absorption solution, while being moved upwardly in vapor lift pipe 35, into two separate streams and conducting such streams of different refrigerant concentration into the absorber 25 in the manner explained, the absorption solution is employed more efficiently and effectively to absorb refrigerant vapor from inert gas. Stated another way, the inert gas weak in refrigerant and passing through the extreme upper part of the absorber coil 25 will be in equilibrium with absorption solution having a concentration of refrigerant considerably less than that of solution in a system having a conventional absorption solution circuit.

In effect, the division of the liquid in vapor lift pipe 35 into two streams enables the stream flowing through conduit 42 to by-pass the boiler 11 which constitutes a high temperature place of vapor expulsion. Thus, the liquid heat exchanger 31 is formed with an intermediate passage 30 for rich absorption solution flowing from the absorber vessel 24 to the vapor expulsion unit 10, an inner passage 47 for weak absorption solution flowing from boiler 11 and having the smallest concentration of refrigerant, and an outer passage 44 for weak absorption solution which by-passes boiler 11 and has a concentration of refrigerant greater than that of solution flowing in the inner passage 47.

The liquid divider of the invention works extremely well and has been found satisfactory for many liquid dividing purposes in absorption refrigeration systems of the kind illustrated in Fig.

1 and just described. Another useful application of the liquid divider of the invention is illustrated in Fig. 2 in which parts similar to those shown in Fig. 1 are referred to by the same reference numerals to which "100" has been added.

In Fig. 2 vapor expelled from solution in boiler 111 flows through conduit 143 into the upper part of vapor lift pipe 135 and, together with vapor from the upper end of the latter, flows through a conduit 148 to a region 146 in pipe 133 which serves as an analyzer and is disposed below the surface level of the liquid column contained therein. The vapor generated in the vapor expulsion unit 110 degresses the surface level of liquid in conduit 148 so that the vapor bubbles through liquid in the pipe 133. After passing through the analyzer 146 the vapor flows through the upper extension of pipe 133 and air-cooled rectifier 116 to condenser 117 in which it is condensed and liquefied.

Liquid refrigerant flows from condenser 117 through a conduit 149 to an evaporator or cooling element 119 in which it evaporates or diffuses into inert gas which enters the lower end thereof through a conduit 150. The rich gas mixture flows from the upper part of cooling element 119 through a conduit 151, one passage of gas heat exchanger 120, conduit 123 and absorber vessel 124 into the lower end of absorber coil 125. In absorber coil 125 the rich gas mixture flows countercurrent to downwardly flowing absorption liquid which enters through a conduit 152. Inert gas weak in refrigerant flows from the absorber coil 125 in a path of flow including conduit 153, another passage of gas heat exchanger 120 and conduit 150 into the lower end of cooling element 119.

Absorption solution enriched in refrigerant flows from the absorber vessel 124 through conduit 129 and inner pipe or passage 154 of liquid heat exchanger 131, the upper end of which is connected to pipe 133 at a point 134 which is at a level below the liquid surface level in the absorber vessel 120 and below the surface level of the liquid column maintained in pipe 133. Liquid is raised by vapor-liquid lift action from the lower end of pipe 133 through vapor lift pipe 135 into the upper end of boiler 111. Absorption solution weak in refrigerant passes from boiler 111 through a connection 155, outer passage 156 of liquid heat exchanger 131 and conduit 152 into the upper part of absorber coil 125.

The outlet end of condenser 117 is connected by an upper extension of conduit 149, vessel 157 and conduit 158 to a part of the gas circuit, as at one end of gas heat exchanger 120, for example, so that any inert gas which may pass through the condenser 117 can flow into the gas circuit. Refrigerant vapor not liquefied in the condenser flows through the upper part of conduit 149 to displace inert gas in vessel 157 and force such gas into the gas circuit. The effect of forcing gas into the gas circuit in this manner is to raise the total pressure in the entire system whereby an adequate condensing pressure is obtained to insure condensation of refrigerant vapor in condenser 117.

In Fig. 2 the liquid divider is provided at the upper end of vapor lift pipe 135, the latter being formed with diametrically opposed openings 140 and 141 with which the conduits 148 and 143, respectively, are in communication. Raised liquid passing through opening 141 flows through conduit 143 into the upper part of boiler 111 in which the principal part of the vapor is generated. As previously explained, weak absorption solution deprived of refrigerant flows from boiler 111 through the heat exchanger 131 and conduit 152 to the upper part of the absorber coil 125. Raised liquid passing through opening 140 flows through conduit 148 into the liquid column maintained in conduit 133.

Hence, liquid being raised in vapor lift pipe 135 is split-up and divided into two streams, one of which passes to boiler 111 and eventually returns to the absorber coil 125 for flow therethrough, while the other stream by-passes the boiler 111 and simply returns to the liquid column in conduit 133 from the lower end of which absorption solution is raised to the liquid divider through the vapor lift pipe 135. The manner in which absorption solution is split up into two streams in the embodiment of Fig. 2 makes it possible to establish ideal pumping conditions in the vapor expulsion unit 110 without circulating an excessive quantity of solution through the absorber 125.

In a vapor-liquid lift pipe 135 of the character under consideration the part of the lift pipe in thermal exchange relation with the heating tube 112 may be referred to as "the vapor forming part" in which vapor bubbles are formed due to heat derived from the heating tube. Due to formation of these vapor bubbles which tend to collect and become larger and larger, liquid in the lift pipe 135 becomes segregated, whereby slugs of liquid are caused to rise in the lift pipe by vapor lift action. Such vapor lift action of liquid is effected by reason of the fact that the inner diameter of the lift pipe 135 is sufficiently small so that vapor cannot freely pass liquid in the lift pipe. Upward movement is imparted to liquid in the vapor lift pipe 135 under the influence of a "reaction head" formed by the liquid column maintained in pipe 133. Stated another way, the weight of the column of liquid in pipe 133 overbalances the weight of the column of segregated liquid bodies and vapor in vapor lift pipe 135 to cause rise of liquid in the latter.

In a vapor lift pump of the kind being described the ratio of the quantity of weak absorption solution being circulated to the quantity of refrigerant vapor generated is referred to as the "pumping ratio" ($y$). When reliable functioning of the vapor lift pump is a primary consideration, it is desirable to provide a pumping ratio in the neighborhood of 6 to 8 when ammonia is employed as the refrigerant and water as the absorption liquid. When low evaporator temperature and performance are viewed as the primary consideration, a pumping ratio of about 3.5 is more suitable. Under such conditions excessive circulation of absorption solution through the liquid heat exchanger and absorber is avoided, the liquid heat exchanger operates more efficiently and is not overloaded, and the absorber functions better to provide for the evaporator inert gas having the weakest possible concentration of refrigerant.

By splitting-up the liquid in the manner shown in Fig. 2 and described above, it is possible to keep recirculating a part of the absorption solution all of the time through the vapor lift pipe. In this manner a high pumping ratio of the order given above can be maintained to insure reliable pumping under all operating conditions encountered without any likelihood of damaging the lift pipe or pump due to overheating which may occur at a lower pumping ratio. The part of the absorption solution that circulates in the local circuit passes from the upper end of lift pipe 135 through opening 140 into conduit 148. The liquid flowing downwardly in conduit 148 passes into pipe 133 and mixes with rich absorption solution flowing from the absorber 125. From the lower end of pipe 133 liquid is raised through pipe 135 by vapor lift action, thus completing the local circuit for a part of the absorption solution.

It will therefore be evident that only the part of the raised absorption solution passing through opening 141 into conduit 143 and boiler 111 eventually finds its way to the absorber 125. Hence, by providing a liquid divider at the upper end of the vapor lift pipe 135, the raised liquid can be divided into two streams of such size that one will give a high pumping ratio of 6 to 8 for the pump or lift pipe while the other stream flowing to the absorber 125 effects circulation of weak absorption solution at a pumping ratio equivalent to about 3.5 providing such weak absorption solution constituted the entire quantity of liquid raised by a vapor lift pipe.

In both the embodiments of Figs. 1 and 2 the liquid divider of the invention operates in a satisfactory manner and enables liquid to be divided and split-up in a predetermined and precise ratio. In both Figs. 1 and 2 the actual division of liquid occurs at the openings formed in the walls of the vapor lift pipes 35 and 135, respectively. The openings 40 and 41 in lift pipe 35 and openings 140 and 141 in lift pipe 135 may also be referred to as overflow points at which regions division of liquid takes place, the division and splitting-up of the liquid being effected while upward movement is being imparted to the liquid to raise the latter from one level to a higher level at the locations of the overflow points or regions. As previously explained, rise of liquid is effected in the vapor lift pipes 35 and 135 by an upward motivating force which is under the influence of the reaction heads formed by the liquid columns in pipes 33 and 133, respectively.

Fig. 3 is a fragmentary view of the upper part of the vapor expulsion unit 110 in which similar parts are designated by the same reference numerals. Fig. 3 differs from Fig. 2 in that an additional conduit 159 is employed which interconnects the upper parts of conduits 143 and 148, respectively, thereby providing an unobstructed connection for vapor flowing from boiler 111 to conduit 148. However, it is to be understood that in the embodiment of Fig. 2 vapor can flow from conduit 143 to conduit 148 through the upper part of vapor lift pipe 135 since vapor bubbles as well as segregated bodies of liquid rise upwardly through the lift pipe. Due to the upward motivating force to which the upwardly moving liquid is subjected, the liquid divides into two streams in a definite ratio which is dependent upon the surface area of the openings 140 and 141 and inversely proportional to the resistance to fluid flow offered by the openings. While a precise and definite split-up of the liquid into several streams can be effected, it is desired to point out that the division of liquid is not always directly proportional to the size of the openings in the walls of the vapor lift pipes.

In absorption refrigeration systems of the inert gas type it is often desirable to provide a so-called "triple heat exchanger" in which heat exchange is effected between (1) rich absorption solution flowing from the absorber to the vapor expulsion unit and (2) weak absorption solution flowing from the vapor expulsion unit to the absorber and (3) vapor which is generated in the vapor expulsion unit and passing to the condenser of the refrigeration system. The vapor passage of such a "triple heat exchanger" serves as an internal rectifier in which absorption liquid vapor accompanying the refrigerant vapor is removed by cooling the mixture to condense out the absorption liquid. When water is employed as the absorption liquid in a system in which the parts and connections are formed of ferrous metal, the water condensed by rectification usually passes into a part of the system not normally protected by a corrosion inhibiting substance. In Fig. 4 is illustrated a further embodiment of the invention in which the liquid divider is advantageously employed to split-up into two streams absorption solution containing a corrosion inhibiting substance, and in which one of the streams is conducted to a place of rectification in the system. Fig. 4 is a fragmentary view of a system like that shown in Fig. 2 in which parts like those illustrated in Fig. 2 are referred to by the same reference numerals to which "500" has been added.

In Fig. 4 vapor expelled from solution in boiler 511 flows through conduit 545 to a region 546 in pipe 533 which serves as an analyzer. After passing through analyzer 546 the vapor flows through conduits 570 and 571 into an outer passage 572 of a "triple heat exchanger" 573. From the "triple heat exchanger" the vapor then flows through a conduit 574 in which the vapors are conducted to a condenser, not shown, in the same manner illustrated in Figs. 1 and 2 and described above.

Absorption liquid enriched in an absorber flows through a conduit 529 into an intermediate passage 575 of the triple heat exchanger, such enriched liquid passing from the passage 575 through a connection 532 into pipe 533 at a point 534. Liquid is raised by vapor lift action from the lower end of pipe 533 through vapor lift pipe 535 into the upper end of boiler 511. Absorption solution weak in refrigerant flows from boiler 511 through an inner passage 576 of the heat exchanger and conduit 552 to the upper part of the absorber for downward flow in the latter.

When ammonia and water are employed as the refrigerant and absorption liquid, respectively, it is usually the practice to provide a corrosion inhibiting substance, such as sodium chromate or sodium nitrite, for example, in the absorption liquid circuit to protect the parts of such circuit which are usually formed of ferrous metal, such as iron or steel. All parts of the absorption liquid circuit in which absorption liquid normally flows are, therefore, protected by the corrosion inhibiting substance present in the absorption liquid. In the embodiment of Fig. 4 generated vapors are introduced into the outer passage 572 of "triple heat exchanger" 573, and, as previously explained, condensation of absorption liquid vapor is effected in such passage which serves as an internal rectifier. When water is employed as the absorption liquid, the condensate formed in the passage 572 is water which flows by gravity into a conduit 577 having a lower looped portion and an upwardly extending portion in thermal relation with the heating tube 112 at 578, as by welding, such upwardly extending portion being in communication with the vapor space of the pipe 533.

It now will be understood that condensate formed in passage 572 flows therefrom by gravity into conduit 577 and is raised in the latter by vapor lift action into the upper end of pipe 533. The passage 572 ordinarily is a place in the absorption liquid circuit which is not reached by absorption liquid containing the corrosion inhibiting substance. In accord with the present invention a liquid divider is provided at the upper end of vapor lift pipe 535 whereby a part of the raised absorption liquid can be diverted into conduit 571. As shown, the upper end of vapor lift pipe 535 is formed with openings 540 and 541 having conduits 571 and 543 in communication therewith. As previously explained, raised liquid is split-up into two streams, one of which passes through opening 541 and conduit 543 into the upper part of boiler 511. The other stream passes through opening 540 and flows through conduit 571 into passage 572 of the triple heat exchanger 573. Accordingly, the walls of the passage 572 are washed with absorption liquid containing a corrosion inhibiting substance so that this part of the vapor expulsion unit 510 will be protected along with other parts through which absorption liquid normally circulates.

It will further be observed that the embodiment of Fig. 4 is similar to that of Fig. 2 in that the part of the absorption liquid passing into conduit 571 and by-passing the boiler 511 flows in a path of flow including passage 572, conduit 577 and pipe 533. From the bottom of pipe 533 the absorption liquid is again raised by vapor lift action in vapor lift pipe 535. Hence, liquid diverted into conduit 571 passes through a local circuit and returns to the lower end of vapor lift pipe 533 without passing through the absorber. The embodiment of Fig. 4 is, therefore, like that of Fig. 2 in that a higher pumping ratio can be maintained for vapor lift pipe 535 while weak absorption liquid can be supplied to the absorber at a rate which is equivalent to a considerably lower pumping ratio for the vapor lift pipe.

In the embodiments illustrated in Figs. 1, 2, 3 and 4 described above, it will be seen that the vapor lift pipes 35, 135 and 535 essentially constitute places of pumping at which absorption liquid is raised from one level to a higher level. The openings 140 and 141 at the upper end of pump pipe 135 in Fig. 2, and similar openings in the pump pipes of the other embodiments, are provided at the places of pumping for splitting the absorption liquid in the act of raising the liquid from a low to a higher level.

In Fig. 2, as in all of the other embodiments illustrated and described, the openings 140 and 141 at the vicinity of the upper end of pipe 135 are in spaced apart relation and communicate with spaced apart peripheral regions of the single rising liquid column in the vertically extending pipe. Upward movement of liquid is effected in an individual stream by raising successive increments thereof progressively higher in such single rising column under the influence of a liquid head formed by liquid in the system. Liquid in the individual stream is divided by spilling liquid directly from the spaced apart peripheral regions of the single rising liquid column, as at the openings 140 and 141 in Fig. 2, for example, the liquid approaching such openings only while ascending and moving upwardly to the higher level. Hence, the openings 140 and 141 are formed in Fig. 2 in a section of the pump pipe 135 through which liquid is only ascending and moving upwardly to the higher level.

In Fig. 2, the pipe or conduit 148 forms part of a local circuit into which a part of the liquid, while moving upwardly in the pump pipe 135, is constantly being diverted through the opening 140. Such diverted liquid flows in a path of flow which by-passes the standpipe 111 and the absorber and flows from the conduit 148 through conduit 133 to the lower end of the pump pipe 135.

Although I have shown and described particular embodiments of my invention, it will be obvious to those skilled in the art that various changes and modifications may be made, and that certain features may be employed independently of others, without departing from the spirit and scope of the invention. I, therefore, aim in the following claims to cover all such modifications and changes as fall within the true spirit and scope of the invention.

What is claimed is:

1. In an absorption type refrigerating system containing absorption liquid, a first vertically extending conduit having an inlet at the lower end thereof, said first conduit providing a passage in which vapor cannot freely pass liquid therein, means comprising a source of heat external to the system for heating said first conduit to effect upward movement of liquid therein by vapor lift action under the influence of a reaction head in the system, the wall of said first conduit having openings at spaced apart regions, and second and third conduits communicating with said openings, said openings serving as overflow points through which liquid moving upwardly in said vertically extending conduit passes so as to divide such liquid into a number of separate streams for flow through said second and third conduits communicating with the openings.

2. Apparatus as set forth in claim 1 including a separating or dividing member extending lengthwise of said first conduit and within the latter, the wall of said first conduit having said openings at opposite sides of said dividing member.

3. Apparatus as set forth in claim 1 including a vessel in which the upper end of said first conduit extends, a separating or dividing member extending lengthwise of said first conduit for dividing the latter and said vessel into two chambers whose upper parts are in open vapor communication with one another, the wall of said first conduit having said openings within said vessel at opposite sides of said dividing member, and each of said second and third conduits being connected to said vessel to receive liquid passing through one of said openings.

4. Apparatus as set forth in claim 3 in which the upper end of said first conduit is in communication with the vapor space of said vessel.

5. Apparatus as set forth in claim 1 in which the upper end of said first conduit is closed and said openings are spaced from such upper closed end.

6. Apparatus as set forth in claim 1 in which the extreme upper end of said first conduit is closed, and an open vapor connection between said second and third conduits.

7. In the art of refrigeration with a system having a path of flow for absorption liquid, the improvement which comprises moving such liquid in the system in an upward direction in an individual stream from a first level to a higher level, effecting such upward movement of liquid in the individual stream by raising successive increments thereof in a single rising fluid column of segregated bodies of liquid and vapor by vapor lift action under the influence of a reaction head formed by liquid in the system, spilling liquid directly from said upwardly moving liquid bodies at the region of said higher level at spaced apart points of said single fluid column, and flowing in a separate path of flow by gravity action a part of the rising liquid spilling at each of said overflow points at the instant such liquid leaves the single rising fluid column and is no longer affected by said reaction head.

8. In the art of refrigeration with a system having a place of absorption and a place of pumping at which absorption liquid is raised or lifted from one level to a higher level by vapor lift action for gravity flow to the place of absorption, the improvement which comprises splitting the absorption liquid into two streams at the place of pumping in the act of raising liquid from said one level to said higher level, and, at all times while the absorption liquid is being lifted by vapor lift action, simultaneously flowing liquid in one of said streams to said place of absorption and flowing liquid in said other stream to said place of pumping for recirculation therethrough without passing through said place of absorption.

9. The improvement set forth in claim 8 in which the absorption liquid contains a corrosion inhibiting substance, the further step of flowing liquid in said other stream to a place in the system in which absorption liquid normally does not circulate and thereafter to said place of pumping for recirculation therethrough without passing through said place of absorption.

10. The improvement set forth in claim 8 in which the absorption liquid contains a corrosion inhibiting substance and vapor is expelled from solution at a place of vapor expulsion, the further steps of flowing expelled vapor in a path of flow through a place of rectification to a place of condensation, and flowing liquid in said other stream through said place of rectification and thereafter to said place of pumping for recirculation therethrough without passing through said place of absorption.

11. The improvement set forth in claim 10 which further includes the step of raising liquid from said place of rectification by vapor lift action to enable such raised liquid to flow by gravity to said place of pumping for recirculation therethrough without passing through the place of absorption.

12. The improvement set forth in claim 8 in which the absorption liquid contains a corrosion inhibiting substance, the system having an absorption liquid circuit including a place of vapor expulsion and said place of absorption and in which circulation of liquid is effected by vapor lift action at said place of pumping, the further steps which include flowing vapor generated at said place of vapor expulsion in a first path of flow to a place of condensation, flowing liquid in said one stream and weak in refrigerant from said place of vapor expulsion to said place of absorption in a second path of flow in heat exchange relation with vapor in said first path of flow, flowing liquid rich in refrigerant from said place of absorption to said place of vapor expulsion in a third path of flow in heat exchange relation with vapor in said first path of flow, said first path of flow constituting a place in the system in which absorption liquid normally is not circulated, and flowing liquid in said other stream through said first path of flow and thereafter to said place of pumping for recirculation therethrough without passing through said place of absorption.

13. In absorption refrigeration apparatus, a circuit for absorption liquid comprising a generator or boiler member, an absorber, and vapor lift means for raising liquid from one level to a higher level and in which vapor cannot freely pass liquid therein, said vapor lift means having an inlet for liquid at the lower end thereof, and means effective under all operating conditions encountered by the apparatus for dividing the liquid in the act of raising such liquid to said higher level by said vapor lift means and for simultaneously flowing one part of such divided liquid to said absorber and from the latter to the inlet of said vapor lift means, and for flowing another part of such divided liquid in a path of flow which by-passes said absorber and conducts liquid to the inlet of said vapor lift means.

14. Apparatus as set forth in claim 13 in which said one part of the divided liquid flows through said boiler member before flowing to said absorber.

15. Apparatus as set forth in claim 13 which includes a vertical conduit whose lower end is connected to the inlet of said vapor lift means and in which a liquid column is maintained by liquid flowing to the inlet of said vapor lift means.

16. Apparatus as set forth in claim 15 including a condenser, means for conducting vapor from said boiler member to said condenser which comprises said path of flow for the other divided part of the liquid and includes a conduit communicating with said vertical conduit at a region below the surface level of the liquid column maintained therein, said vertical conduit being connected to receive liquid from said absorber at a region which also is below the surface level of the liquid column maintained therein.

17. In the art of refrigeration with a system having a path of flow for absorption liquid, the improvement which comprises moving such absorption liquid in an upward direction in an individual stream from a first level to a higher level, effecting such upward movement of absorption liquid in the individual stream by raising successive increments thereof progressively higher by vapor lift action in a single rising column under the influence of a reaction head formed by a column of absorption liquid, dividing liquid in said individual stream by spilling liquid directly from spaced apart peripheral regions of said single rising liquid column which are at the vicinity of said higher level and toward which absorption liquid approaches only while ascending and moving upwardly to said higher level, and flowing in a separate path of flow by gravity action a part of the rising absorption liquid spilling at each of said peripheral regions at the instant such liquid leaves the single column of rising absorption liquid and is no longer under the influence of said reaction head.

18. In absorption refrigeration apparatus, a circuit for circulation of absorption liquid including a vapor expulsion unit and an absorber, pumping means in said circuit for raising liquid from one level to a higher level, a vessel in said circuit which receives liquid raised to said higher level by said pumping means, means for conducting liquid from said vessel only to said absorber and from the latter to said pumping means at said one level, and means providing a local circuit for absorption liquid in said vapor expulsion unit in which a portion of the absorption liquid is constantly recirculated and never reaches said absorber, said local circuit including a connection into which part of the liquid, while moving upwardly in said pumping means to said higher level, is constantly diverted, and conduit means for conducting all liquid diverted into said connection in a path of flow which by-passes said vessel and said absorber and communicates with said pumping means at said one level.

19. In absorption refrigeration apparatus, a circuit for absorption liquid comprising a generator or boiler member, an absorber, and pumping means for raising liquid from one level to a higher level, said pumping means having an inlet for liquid at the lower end thereof, means operable at all times for dividing the liquid in the act of raising the liquid to said higher level by said pumping means, first conduit means for conducting one part of such divided liquid from said higher level to said absorber and from the latter to the inlet of said pumping means, and second conduit means for conducting another part of such divided liquid in a path of flow which by-passes said absorber and conducts liquid to the inlet of said pumping means, said liquid dividing means diverting into said second conduit means from said pumping means a part of the liquid during upward movement thereof to said higher level.

20. In absorption refrigeration apparatus, a circuit for absorption liquid including means providing a liquid column and a single conduit having an inlet at the lower end thereof connected to receive liquid from such column which serves as a reaction head, means for effecting upward movement of liquid in said single conduit by vapor-liquid lift action under the influence of said reaction head through a vertically extending section of said conduit from a first level to a second higher level, the wall of said conduit having openings which are spaced apart from one another in said section thereof through which liquid only ascends and moves upwardly to said second higher level, and means including conduits communicating with said openings which provide several paths of flow in each of which liquid flows by gravity action the instant liquid passes through one of said wall openings and leaves the liquid moving upwardly in the vertically extending section of said single conduit.

References Cited in the file of this patent

UNITED STATES PATENTS

| Number | Name | Date |
| --- | --- | --- |
| 1,798,946 | Maiuri et al. | Mar. 31, 1931 |
| 1,908,901 | Knight | May 16, 1933 |
| 1,993,380 | Nelson et al. | Mar. 5, 1935 |
| 2,141,609 | Lenning | Dec. 27, 1938 |
| 2,242,814 | Coons | May 20, 1941 |
| 2,268,381 | Brace | Dec. 30, 1941 |
| 2,271,565 | Nelson | Feb. 3, 1942 |
| 2,287,855 | Babcock | June 30, 1942 |
| 2,368,455 | Edberg | Jan. 30, 1945 |
| 2,422,401 | Gaugler | June 17, 1947 |